Aug. 28, 1962 A. E. CARLSON ET AL 3,051,839

PHOTOCONDUCTIVE ELEMENT

Filed July 20, 1959

INVENTORS
ALLAN E. CARLSON
JACOB M. JOST
BY
Francis L. Masselle
ATTORNEY

United States Patent Office 3,051,839

Patented Aug. 28, 1962

3,051,839
PHOTOCONDUCTIVE ELEMENT

Allan E. Carlson, Euclid, and Jacob M. Jost, Cleveland, Ohio, assignors to Clevite Corporation, Cleveland, Ohio, a corporation of Ohio Filed July 20, 1959, Ser. No. 828,375
5 Claims. (Cl. 250—211)

Figures 1, 2, 3:
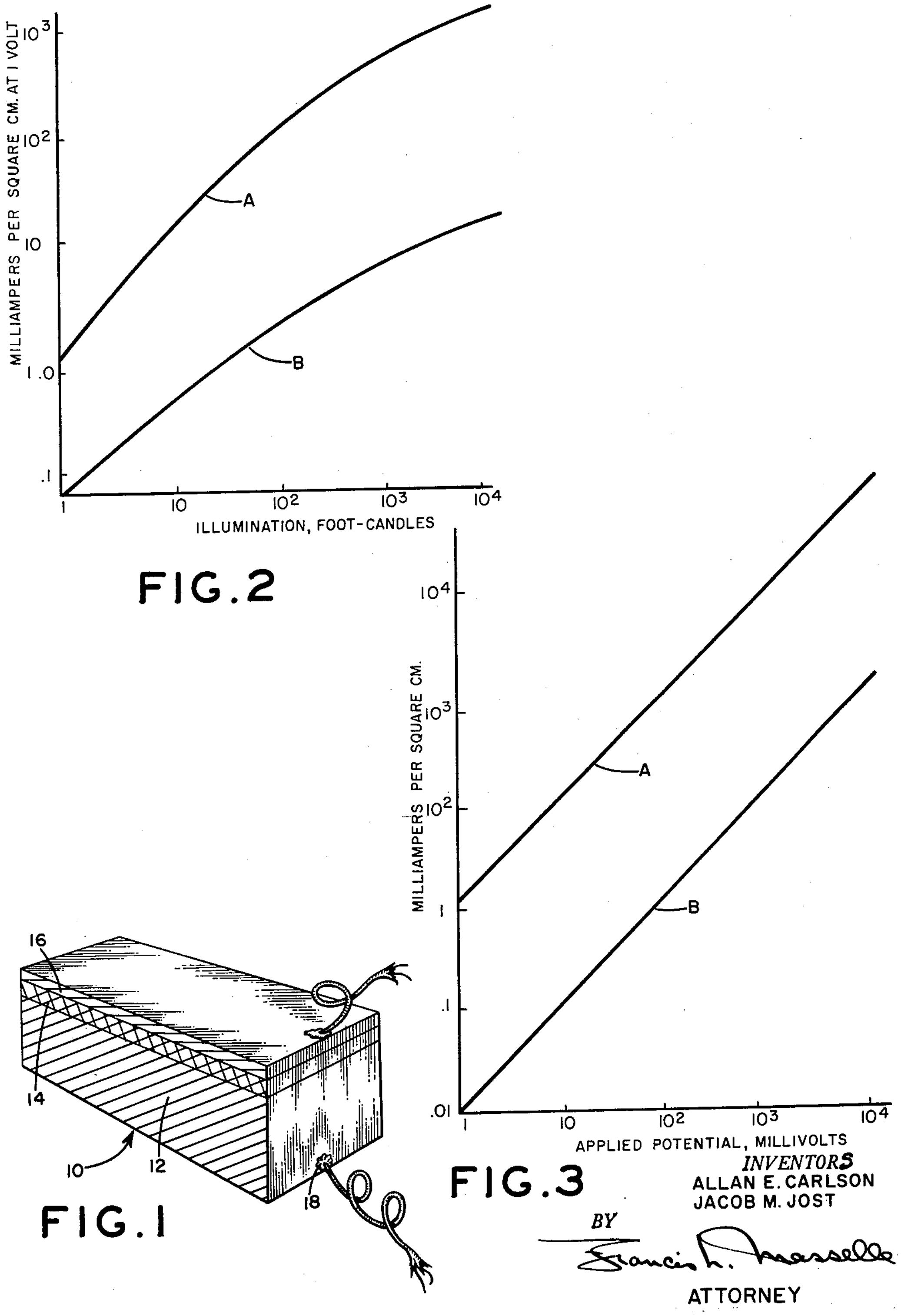

This invention relates to photoconductive elements or cells fabricated of cadmium sulfide or selenide.

The photosensitivity of the semiconductive compounds cadmium sulfide and cadmium selenide, both in monocrystalline and polycrystalline form, is known. The photoconductivity of these materials has been especially well-explored and is utilized in many commercial devices, such as television iconoscopes and photoconductive cells. As is well understood, the photoconductive effect may be defined as the change of electrical conductivity (specific conductance) of a material in response to variations in the intensity of incident radiation. The range of wave lengths of radiation to which any given photosensitive material responds (hereinafter referred to as the "photoeffective radiation") is a specific property of the material. For cadmium sulfide and selenide this range includes a substantial portion of the visible spectrum, a fact which enhances the importance of these materials in the field of photoconductive elements and devices.

In a practical photoconductive element, the resistance in the dark or under low level illumination is very high. When exposed to photoeffective radiation, the element becomes conductive; the relation between conductance and radiation intensity is directly linear up to a point where there is incipient saturation of the conductance. As a practical matter the conductance of the element at this point limits the range of usefulness of the element because the illumination intensity required to significantly further increase conductance usually is not available in most applications and service situations. A practical figure of merit, therefore, in the evaluation of photoconductive elements may be taken as $$\frac{\text{Conductance/unit area exposed}}{\text{Radiation/unit area}}$$

Another figure of merit of photoconductive elements is the sensitivity, which is the change in conductance per unit change in radiation intensity. Obviously it is important for most applications that photoconductive elements have relatively high sensitivity as well as high illuminated conductivity. In the final analysis, however, it is the latter characteristic which limits the current flow in the "on" condition and, consequently determines the circuitry required in a given application.

The only photocells commercially available at the present time which have the current-carrying capacity sufficient to operate even a miniature relay directly are those employing a cadmium sulfide or cadmium selenide element. In most cases relatively extensive amplifying and/or control circuitry is required. Thus, for example, a common use for photoconductive cells is in automatic headlight dimmers for motor vehicles. In such a device the limits imposed by the relatively low conductivity of available photoconductive elements and the relatively low level of illumination intensity to which it must respond, has resulted in the need for complex circuitry to perform so simple a function as operating a headlight relay. It will be readily appreciated, therefore, that a photoconductive element having a lower minimum resistivity and, concomitantly, a higher current-carrying capacity is highly to be desired.

It is a fundamental object of the present invention to provide photoconductive elements characterized by much higher conductance per unit area exposed at any given radiation intensity than any heretofore available.

Another object is the provision of photoconductive elements combining high conductivity at reasonable radiation intensity with high sensitivity.

Still another object is the provision of photoconductive elements of high current-carrying capacity and high dark resistance.

These and further objects are accomplished by novel photoconductive elements in accordance with the invention which comprise a monocrystalline plate of a semiconductive material consisting essentially of cadmium sulfide and/or cadmium selenide heavily doped throughout its bulk with a donor impurity selected from the group consisting of indium, gallium, chlorine and iodine. A thin layer of the plate adjacent one of its major surfaces is doped with an acceptor impurity selected from the group consisting of copper, silver and gold. An electrode is provided making ohmic contact with a large area of said major surface and a second electrode makes ohmic contact with the plate at a location removed from the thin layer.

Additional objects of the invention, its advantages, scope and the manner in which it may be practiced will be apparent to those conversant with the art from the following description and subjoined claims taken in conjunction with the annexed drawing in which, FIGURE 1 is a diagrammatic cross-sectional view of a photoconductive element according to the present invention; and FIGURES 2 and 3 are graphs of photoconductive characteristics of a typical element according to the invention and of a comparable prior art element.

Referring to FIGURE 1, reference numeral 10 designates the photoconductive element as a whole. It comprises a monocrystalline plate 12 of cadmium sulfide, cadmium selenide, or a mixture of both, doped throughout its bulk with a donor impurity consisting essentially of indium, gallium, chlorine or iodine. The concentration of the donor impurity should be such as to impart high electrical conductivity to the crystal, e.g., in the order of 1 ohm per cm. Usually the concentration is at least about .01 mol percent.

The crystal from which plate 12 is cut may be grown in any suitable manner. The donor impurity may be "grown in," e.g., by growing the crystal from material "doped" with the impurity, or the impurity can be incorporated subsequently, as by diffusion. It is preferred to incorporate the donor impurity in the crystal during growth and, to this end, it has been found satisfactory, for example, to dope CdS powder to be crystallized with 0.10 weight percent indium sulfide ($In_2S_3$). Additional details of the manner of growing crystals will be described hereinafter. At this point suffice it to say that plate 12 is heavily doped with the donor impurity to have a low resistivity (i.e., .0005 to 10 ohm-cm.) preferably less than one ohm-cm.

Adjust one major surface of plate 12 is a very thin photoconductive layer 14 which, in addition to the donor impurity, also contains an acceptor impurity selected from the group consisting of copper, silver and gold. Layer 14 is formed by diffusing the acceptor impurity into the surface of plate 12 and then reducing the thickness of the layer, if necessary, all in a manner hereinafter described with particularity. The thickness dimension of layer 14 should be as small as practical, i.e., on the order of 0.001 cm.; in addition the layer must be substantially free of discontinuities.

Making large area surface contact with layer 14 is an ohmic electrode represented diagrammatically at 16. A second ohmic electrode 18 makes contact with plate 12 at some location removed from photoconductive layer 14. Electrode 16 may be a thin metal layer applied in any suitable manner. The only limitations on the material of the electrode, and the manner of its application are that it make ohmic contact with layer 14 and be reasonably adherent thereto. Thus, electrode 16 may be applied by (1) electro-deposition from solution, (2) "electroless" deposition from solution, (3) pyro-decomposition of solutions of unstable salts of noble metals, e.g., gold and platium chlorides, or (4) conducting metal powder compositions in a suitable vehicle, which may be baked on or air cured.

Particularly satisfactory results have been obtained by forming electrode 16 from cadmium-indium solder. Pressure contacts of indium also give good results.

Electrode 18, being in contact with the low resistance crystal plate 12 can be of relatively small contact area as shown.

Either or both electrodes 16 and 18 must be such as to allow access to photoconductive layer 14 by photoeffective radiation. Ideally, electrode 16 would be transparent to such radiation if this were possible. In the absence of any known material for providing an electrode of the desired transparency and low resistance, electrode 18 is formed and/or located so as to provide a minimum of obstruction to radiation passing through crystal plate 12 (i.e., from below as viewed in the drawing). Alternatively or additionally, electrode 16 can be provided with a "window" or arranged to cover substantially less than the entire surface of layer 14.

The operation of photoconductive elements as described, insofar as is known and understood, can be explained on the basis of generally accepted theories of solid state photoconductive. In its equilibrium (dark) condition, photoconductive layer 14 is effectively a non-conductor having a specific resistance of over a million ohm-cms. Consequently, when connected in series with an external circuit (not shown) including a source of E.M.F. no significant current flows between electrodes 16 and 18. When exposed to photoeffective illumination, the incident photons pass through the crystal plate 12 and strike photoconductive layer 14. The absorption of photons by layer 14 results in the formation of electron-hole pairs which, being mobile, function as charge carriers, drifting between electrodes 16 and 18 causing current to flow.

Inasmuch as the average transit time for a charge between the electrodes may be a million times shorter than the lifetime of the charge carriers, a sort of amplification takes place in the sense that the electric current through the element is a million times the "light current" flowing into it. Viewed externally, this phenomenon manifests itself as an extreme decrease in the resistance of layer 14 from the order of millions of ohms in the dark to one ohm under sufficient illumination to cause incipient saturation.

The method of fabrication of element 10 in accordance with the present invention will now be described using CdS as an example of the semiconductor.

The initial operation is the growth of suitably-doped CdS crystals. For this purpose cadium sulfide powder is mixed with 0.1 weight percent of $In_2S_2$ and presintered at about 700° C. in vacuo. This effects some purification and a desirable degree of compaction. The resulting sintered slug of CdS then is placed in a quartz-glass tube, sealed under an argon atmosphere, and heated in a furnace so as to maintain the slug at a temperature of about 1300° C. while a growing zone of the tube is somewhat cooler, e.g., at about 1250° C. These conditions are maintained for from two to ten days followed by slow cooling (e.g., 30° C./hour). So treated the CdS sublimes and redeposits in the cooler region of the tube. The tube is broken to remove the crystals which are then cut into slices in any suitable manner.

The photoconductive layer 14 is formed on the crystal slice by duffusing in a donor impurity selected from the group consisting of copper, silver and gold. Copper is deemed to be the most satisfactory donor and will be used as an example.

The particular depth of diffusion is not critical except in that it must be equal to or greater than the final thickness dimension of layer 14 which is empirically determined as hereinafter explained. In most cases the diffusion depth is in the range from .0001 to .05 cm. While there is no theoretical upper limit on the depth, it will be seen presently that, as a practical matter, there is no reason to exceed the stated value, i.e., .05 cm.

The diffused copper is believed to be in the form of monovalent Cu ions; the starting material may be a suitable compound such as cuprous oxide ($Cu_2O$) or cuprous sulfide ($Cu_2S$ or metallic copper can be used as will be seen as this description proceeds.

Assuming first the use of a cuprous compound, specifically cuprous oxide, this is conveniently prepared in suitable form by oxidation of thin sheets of electrolytic copper in air at a temperature of 1000° C. and reducing the resulting oxide to fine powder by milling or grinding. The powder is then suspended in a suitable vehicle such as carbon tetrachloride.

The crystal slice is etched in hydrochloric acid followed by a rinse in distilled water. The cuprous oxide suspension is then applied to one major surface and the slice heated in a furnace at 550° to 600° C. for one-half to one hour. Neither the time nor the temperature of heating appears to be critical. Temperatures as low as 400° C. have been found satisfactory although a longer time is required to cause diffusion to the desired depth. Temperatures higher than 600° C. hasten diffusion but at the expense of control and reproducibility.

After cooling, the element is etched in hydrochloric acid for about thirty seconds to remove loosely adhering undiffused cuprous oxide.

When the diffusion doping is carried out using metallic copper this is applied to the crystal surface by electroplating. The Cu plating oxidizes during the initial stages of the diffusion heat treatment and thereafter diffuses into the crystal in the same manner as where cuprous oxide is used initially.

The thickness of the copper plating is a factor of considerable importance: too thin a plate results in discontinuities and, concomitantly, a heterogeneous photo conductive layer 14; too thick a plate results in incomplete oxidation of the copper during the diffusion heat treatment, which is unsatisfactory because the diffusion apparently does not start until the cuprous oxide is formed.

The precise thickness of the copper plating varies with the parameters of the diffusion treatment and, therefore, cannot be stated categorically. However, by way of example it is pointed out that the thickness of plating deposited in 30 seconds from a saturated copper sulfate solution at 6 volts and a current of 80 ma. per cm.$^2$ was satisfactory when diffused at 500° C. for 20 minutes. On the other hand copper plating for three minutes was too long for an element diffused at 400° C. for one hour and five seconds was too brief a plating time for diffusion at 500° C. for 20 minutes.

After diffusion is complete a typical element has a resistivity of 1000 ohm-cm. under an illumination of 7500 foot candles from an incandescent tungsten source. The thickness of layer 14 then is reduced as much as possible without introducing discontinuities in the layer or causing loss of dark resistance. This reduction is accomplished by abrasion and/or etching of the appropriate surface of plate 12. The reduction preferably is carried out in small increments, checking the resistance of the element at each stage. Where reduction is accomplished by abrasion, the disrupted layer preferably is removed by etching prior to each resistance test.

Taking a typical cell with a diffused layer 14 of an initial thickness of about .03 cm. an area of 20 mm.$^2$ and an illuminated resistance of 1000 ohms, after reducing the thickness of layer 14 by $2\times10^{-3}$ cm. the light resistance was down to 300 ohms. After further reduction, bringing the total to $10^{-2}$ cm., this resistance was down to 50 ohms. Continued reduction reduced the illuminated resistance to 10 ohms before loss of dark resistance, at which time the total reduction amounted to $2.74 \times 10^{-2}$ cm. Prior to this time the dark resistance remained in excess of 20 megohms.

Photoconductive elements in accordance with the present invention have relatively uniform sensitivity, the typical dark to light resistance ratio being in the order of $10^9$:1, light resistance being measured under an illumination of 4000 foot-candles from a tungsten source. The light resistance is about 100 times less than any comparable prior art cells of knowledge. This markedly lower resistivity exists at all levels of illumination as demonstrated graphically in FIGURE 2 wherein current density at one volt is plotted against illumination in foot-candles for a typical cell according to the present invention (curve A) and, for comparison, a comparable prior art cell of equal exposed area (curve B). The effect of varying voltage on current density at a constant illumination of 7500 foot candles is shown in FIGURE 3 for such a typical cell (curve A) and prior art cell (curve B).

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by U.S. Letters Patent is:

1. A photoconductive cell comprising: a monocrystalline plate of at least one semiconductive material selected from the group consisting of cadmium sulfide and cadmium selenide, doped throughout its bulk with a donor impurity selected from the group consisting of indium, gallium, chlorine and iodine, a thin layer of said plate adjacent one major surface thereof being doped with an acceptor impurity selected from the group consisting of copper, silver and gold; an electrode making ohmic contact with a large area of said major surface; and a second electrode making ohmic contact with said plate at a location removed from said thin layer.

2. A photoconductive cell comprising a monocrystalline plate of at least one semiconductive material selected from the group consisting of cadmium sulfide and cadmium selenide heavily doped throughout its bulk with a donor impurity selected from the group consisting of indium, gallium, chlorine and iodine, said doped material having a bulk resistivity not exceeding 10 ohm-cms.; a thin layer on one major surface of said plate doped with an acceptor impurity selected from the group consisting of copper, silver and gold, said layer having a thickness dimension less than .05 cm.; an electrode making ohmic contact with a large area of said major surface; and a second electrode making ohmic contact with said plate at a location removed from said thin layer.

3. A photoconductive cell comprising a monocrystalline plate of at least one semiconductive material selected from the group consisting of cadmium sulfide and cadmium selenide doped throughout its bulk with indium and having a bulk resistivity in the order of 1 ohm-cm.; a thin layer on one major surface of said plate doped with an acceptor impurity selected from the group consisting of copper, silver and gold, the thickness dimension of said thin layer being such that the electrical resistance of said layer at a predetermined level of illumination is substantially a minimum and in the dark is several orders of magnitude greater; an electrode making ohmic contact with a large area of said major surface; and a second electrode making ohmic contact with said plate at a location removed from said thin layer.

4. A photoconductive cell comprising a monocrystalline plate of at least one semiconductive material selected from the group consisting of cadmium sulfide and cadmium selenide doped with indium throughout its bulk to a concentration of at least 0.01 mol percent and having a bulk resistivity not exceeding 10 ohm-cms; a thin layer on one major surface of said plate doped with copper in a concentration in the order of about 0.1 mol percent, the thickness dimension of said layer being in the order of about 0.001 cm., an electrode making ohmic contact with a large area of said major surface; and a second electrode making ohmic contact with said plate at a location removed from said thin layer.

5. A photoconductive cell comprising a monocrystalline plate of cadmium sulfide doped with indium throughout its bulk to a concentration of at least about .01 mol percent; a thin layer on one major surface of said plate doped with copper in a concentration of about 0.1 mol percent, the thickness dimension of said thin layer being about 0.001 cm.; an electrode making ohmic contact with a large area of said major surface; and a second electrode making ohmic contact with said plate at a location removed from said thin layer.

References Cited in the file of this patent

UNITED STATES PATENTS

| | | |
|---|---|---|
| 2,277,013 | Carlson | Mar. 17, 1942 |
| 2,706,791 | Jacobs et al. | Apr. 19, 1955 |
| 2,706,792 | Jacobs | Apr. 19, 1955 |
| 2,745,021 | Kurshan | May 8, 1956 |
| 2,805,347 | Haynes et al. | Sept. 3, 1957 |
| 2,853,764 | DiMichele | Sept. 30, 1958 |
| 2,861,160 | Hersh | Nov 18, 1958 |
| 2,879,182 | Parkswer et al. | Mar. 24, 1959 |
| 2,879,405 | Pankove | Mar. 24, 1959 |